(12) United States Patent
Zhang et al.

(10) Patent No.: US 10,244,258 B2
(45) Date of Patent: Mar. 26, 2019

(54) METHOD OF SEGMENTAL PREDICTION FOR DEPTH AND TEXTURE DATA IN 3D AND MULTI-VIEW CODING SYSTEMS

(71) Applicant: MediaTek Singapore Pte. Ltd., Singapore (SG)

(72) Inventors: Kai Zhang, Beijing (CN); Jicheng An, Beijing (CN); Xianguo Zhang, Beijing (CN); Han Huang, Beijing (CN); Jian-Liang Lin, Su'ao Township, Yilan County (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 15/032,205

(22) PCT Filed: Jun. 23, 2015

(86) PCT No.: PCT/CN2015/082074
§ 371 (c)(1),
(2) Date: Apr. 26, 2016

(87) PCT Pub. No.: WO2015/196966
PCT Pub. Date: Dec. 30, 2015

(65) Prior Publication Data
US 2016/0269751 A1    Sep. 15, 2016

(30) Foreign Application Priority Data

Jun. 23, 2014 (WO) ................ PCT/CN2014/080515
Sep. 22, 2014 (WO) ................ PCT/CN2014/087094
Oct. 21, 2014 (WO) ................ PCT/US2014/089040

(51) Int. Cl.
*H04N 19/597*    (2014.01)
*H04N 19/105*    (2014.01)
(Continued)

(52) U.S. Cl.
CPC ......... *H04N 19/597* (2014.11); *H04N 19/105* (2014.11); *H04N 19/172* (2014.11);
(Continued)

(58) Field of Classification Search
CPC ............. H04N 13/0048; H04N 19/597; H04N 19/105; H04N 19/70; H04N 19/1762; H04N 19/182; H04N 19/172
See application file for complete search history.

(56) References Cited

U.S. PATENT DOCUMENTS 6,798,834 B1    9/2004 Murakami et al.
9,380,298 B1 *  6/2016 Gu ..................... H04N 19/00
(Continued)

FOREIGN PATENT DOCUMENTS

| CN | 101682778 | 3/2010 |
| CN | 102714741 | 10/2012 |
| CN | 103004206 | 3/2013 |

OTHER PUBLICATIONS

International Search Report dated Sep. 29, 2015, issued in application No. PCT/CN2015/082074.

*Primary Examiner* — Leron Beck
*Assistant Examiner* — Berteau Joisil
(74) *Attorney, Agent, or Firm* — McClure, Qualey & Rodack, LLP

(57) ABSTRACT

A method and apparatus for processing a prediction block and using the modified prediction block for predictive coding of a current block are disclosed. Embodiments according to the present invention receive a prediction block for the current block and classify pixels in the prediction block into two or more segments. Each segment of the prediction block is then processed depending on information derived from each segment of the prediction block to form a modified prediction segment. The modified prediction
(Continued)

block consisting of modified prediction segments of the prediction block is used as a predictor for encoding or decoding the current block.

24 Claims, 5 Drawing Sheets

(51) Int. Cl.
*H04N 19/172* (2014.01)
*H04N 19/176* (2014.01)
*H04N 19/182* (2014.01)
*H04N 19/70* (2014.01)
*H04N 13/161* (2018.01)

(52) U.S. Cl.
CPC ......... *H04N 19/176* (2014.11); *H04N 19/182* (2014.11); *H04N 19/70* (2014.11); *H04N 13/161* (2018.05)

(56) References Cited

U.S. PATENT DOCUMENTS

| | | | |
|---|---|---|---|
| 2008/0304569 A1* | 12/2008 | Lee | H04N 19/139 375/240.16 |
| 2011/0243436 A1* | 10/2011 | Seregin | H04N 19/00533 382/166 |
| 2012/0183057 A1 | 7/2012 | Oh et al. | |
| 2012/0200669 A1 | 8/2012 | Lai et al. | |
| 2013/0279568 A1* | 10/2013 | Matsunobu | H04N 19/0009 375/240.03 |
| 2015/0215617 A1* | 7/2015 | Leontaris | H04N 19/82 375/240.03 |
| 2016/0021389 A1 | 1/2016 | Suzuki et al. | |
| 2016/0057441 A1* | 2/2016 | Skupin | H04N 19/137 375/240.25 |

\* cited by examiner

METHOD OF SEGMENTAL PREDICTION FOR DEPTH AND TEXTURE DATA IN 3D AND MULTI-VIEW CODING SYSTEMS

CROSS REFERENCE TO RELATED APPLICATIONS

The present invention is a national stage application of PCT Patent Application PCT/CN2015/082074, which claims priority to PCT Patent Application, Ser. No. PCT/CN2014/080515, filed on Jun 23, 2014, PCT Patent Application, Ser. No. PCT/CN2014/087094, filed on Sep 22, 2014and PCT/CN2014/089040, filed on Oct 21, 2014. The PCT Patent Applications are hereby incorporated by reference in their entireties.

TECHNICAL FIELD

The present invention relates to video coding. In particular, the present invention relates to classifying a prediction block into segments and processing the segments individually to form a processed-segmented prediction block. Then, the processed-segmented prediction block is then used for predictive coding of a current block.

BACKGROUND

Prediction plays a critical role in video coding, where current video data is coded by using previously reconstructed video data or other derived data as predictor. When coding or decoding a block, a prediction block corresponding to intra-prediction or inter-prediction is generated first. The prediction residue is then formed at the encoder side based on the current block and the prediction block. At the decoder side, the prediction block is used to reconstruct the reconstructed samples using the coded prediction residue.

Besides inter-prediction and intra-prediction, a new prediction mode named intra-block copy (IBC) has been adopted in the screen content coding (SCC) profile for the high efficiency video coding (HEVC) standard. IBC can take advantage of copying contents in the same picture. FIG. 1 illustrates an example of IBC, where a reference block (120) in the current picture is copied to the current block (110) as the prediction if IBC is applied. The reference block is located by applying a block-copying vector (BV, 130). The example in FIG. 1 shows that the BV points to the reference block horizontally. However, the BV can be a two-dimensional vector not restricted to be horizontal. The samples in the reference block have been reconstructed already before the current block is coded or decoded.

Inter simplified depth coding (InterSDC) is adopted into 3D-HEVC (three-dimensional HEVC) as a special prediction mode for depth coding. When InterSDC is used, a normal inter-prediction is first performed for the current block. A coded offset is then added to each pixels in the prediction block. If $P_{i,j}$ represents the prediction value at pixel position (i, j) after performing the normal inter-prediction and Offset is the coded offset for this block, the final prediction value at pixel position (i, j) is $P_{i,j}$+Offset. With the InterSDC mode, no residues are coded. Thus the final prediction value will be output as the reconstructed value.

Depth lookup table (DLT) is adopted into 3D-HEVC. Since there are often only a small number of pixel values appearing in the depth component, the DLT signals those valid values from the encoder to the decoder. When a coding unit (CU) is coded in the intra simplified depth coding (SDC) mode or depth map modeling (DMM) mode, DLT is used to map the valid depth values to DLT indices. The DLT index is more efficient for compression. FIG. 2 illustrates an example of the DLT process, where only five pixel values (i.e., 50, 108, 110, 112 and 200) among the 256 possible pixel values appear in a picture block (e.g., a coding unit). The five pixel values can be represented using five DLT indices (i.e., 0, 1, 2, 3 and 4). The DLT can be signaled in picture parameter set (PPS). And it is up to the encoder to derive the DLT during the encoding process.

Since prediction values come from reconstructed pixels, there are distortions between the prediction values and the original values even if the original pixels in the current block and the original pixels in the reference block are exactly the same. Furthermore, since the reconstructed signal loses high-frequency information generally, the quality of prediction is deteriorated more when there are sharp pixel value changes in the reference block. FIG. 3 and FIG. 4 demonstrate two examples, where there are two and three segments with sharp edges in a block.

Accordingly, it is desirable to develop a method for prediction that can take into consideration of sharp transitions in the prediction block to improve coding performance.

SUMMARY

A method and apparatus for processing a prediction block and using the modified prediction block for predictive coding of a current block are disclosed. Embodiments according to the present invention receive a prediction block for the current block and classify pixels in the prediction block into two or more segments. Each segment of the prediction block is then processed depending on information derived from each segment of the prediction block to form a modified prediction segment. The modified prediction block consisting of modified prediction segments of the prediction block is used as a predictor for encoding or decoding the current block.

The pixels in the prediction block can be classified based on pixel values, pixel positions or gradients of the pixels in the prediction block. For example, the pixels in the prediction block are classified into two segments according to relationship of the pixel values of the pixels in the prediction block with respect to a threshold T. The threshold T can be calculated according to: the average value of the pixels in the prediction block; the middle value of the pixels in the prediction block; the average value of partial pixels in the prediction block; the average value of four corner pixels in the prediction block; or the average value of a minimum pixel value and a maximum pixel value in the prediction block. In another example, the pixels in the prediction block are classified into M segments according to relationship of the pixel values of the pixels in the prediction block with respect to (M−1) thresholds $T_1, T_2, \ldots, T_{M-1}$, and wherein $T_1 \leq T_2 \leq \ldots \leq T_{M-1}$ and M is greater than 2. Threshold $T_k$ can be calculated based on the pixel values of the pixels in the prediction block, where k is from 1 to (M−1). For example, M is equal to 3; the pixel in the prediction block is classified into segment 0 if the pixel value for the pixel is smaller than $T_1$ or no larger than $T_1$; the pixel in the prediction block is classified into segment 2 if the pixel value for the pixel is larger than $T_2$; otherwise, the pixel in the prediction block is classified into segment 1; and wherein $T_1=(T+Vmin)/2$, $T_2=(Vmax+T)/2$, T is an average value of the pixels in the prediction block, and Vmax and Vmin are the maximum pixel value and the minimum pixel value in the prediction block respectively. In yet another example, the pixels in the prediction block are classified into two or more segments according to the gradients of the pixels in the prediction block using Sobel, Roberts, and Prewitt operator on the pixels in the prediction block.

In one embodiment, the processing of each segment of the prediction block may add an offset $Off_U$ to the pixel value of each pixel in segment U. In another embodiment, the processing of each segment of the prediction block may add an offset $Off_U$ to an estimated pixel value $E_U$ of segment U for all pixels in the segment U to form a modified prediction segment for the segment U. The estimated pixel value $E_U$ can be calculated according to a function of pixel values in the segment. For example, the estimated pixel value $E_U$ can be calculated according to the average value of the pixels in the segment U; the middle value of the pixels in the segment U; the average value of a minimum pixel value and a maximum pixel value of the pixels in segment U; or the mode value of the pixels in the segment U, where the mode value of the pixels in the segment U corresponds to a most frequent appearing pixel value in the segment U.

The estimated pixel value $E_U$ can be calculated based on all pixels in the segment U. The estimated pixel value $E_U$ may also be calculated based on partial pixels at special positions in the segment U. For example, the estimated pixel value $E_U$ can be calculated as the mode value of the partial pixels at the special positions in the segment U. The partial pixels at the special positions in the segment U may correspond to every other pixels in the segment U horizontally and vertically. If no pixel exists at the special positions in the segment U, a default estimated pixel value $E_U$ can be used. The default estimated pixel value $E_U$ may correspond to 0, 128, 255, 1<<(bit_depth−1) or (1<<bit_depth)−1, and where bit_depth corresponds to the bit depth of the pixel values of the pixels in the segment U.

The current block may correspond to a coding tree unit (CTU), coding unit (CU), prediction unit (PU), or transform unit (TU). The encoder may transmit information to the decoder in video parameter set (VPS), sequence parameter set (SPS), picture parameter set (PPS), slice header (SH), CTU, CU, PU or TU regarding whether to use segmental prediction process. The segmental prediction process can be applied to coding units with a size larger than 8×8 or smaller than 64×64. In another case, the segmental prediction process can be applied to coding units with 2N×2N partition. The segmental prediction process can be applied to coding units coded in an Intra block copy (IntraBC) mode, or Inter simplified depth coding (InterSDC).

The syntax element representing the number of segments can be transmitted from an encoder to a decoder or the number of segments can be derived at the decoder implicitly. The syntax element representing the number of segments can be transmitted in VPS, SPS, PPS, SH, CTU, CU, PU or TU. The offset can also be transmitted in VPS, SPS, PPS, SH, CTU, CU, PU or TU.

The input data subject to the segmental prediction process may correspond to the texture data or depth data of the current picture. The input data may also correspond to chroma components of the current picture. The chroma components of the current picture may use separate information or share the same information related to segmental prediction process.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
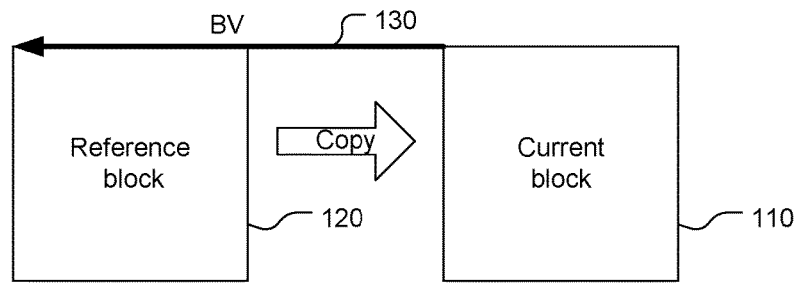
FIG. 1 illustrates an example of Intra block copy (IntraBC) process, where a current block is predicted by a reference block in the same picture and a block vector is used to locate the reference block.
Figure 2:
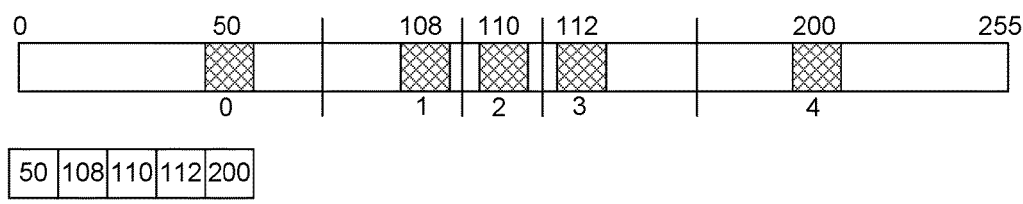
FIG. 2 illustrates an example of the depth lookup table (DLT) process, where only five pixel values (i.e., 50, 108, 110, 112 and 200) among the 256 possible pixel values appear in a picture block (e.g., a coding unit).
Figures 3, 4:
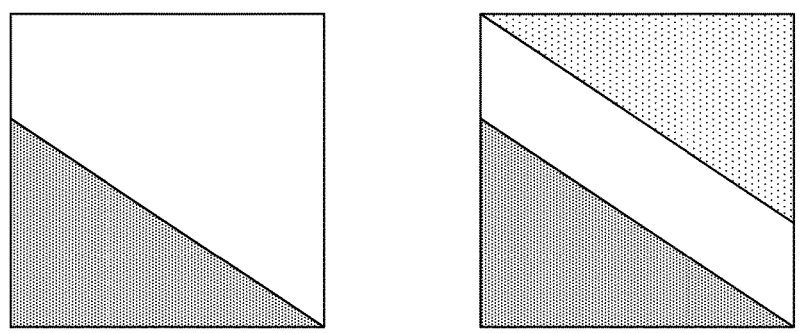
FIG. 3 illustrates an example of two segments with a sharp edge in a block.
FIG. 4 illustrates an example of three segments with sharp edges in a block.
Figure 5:
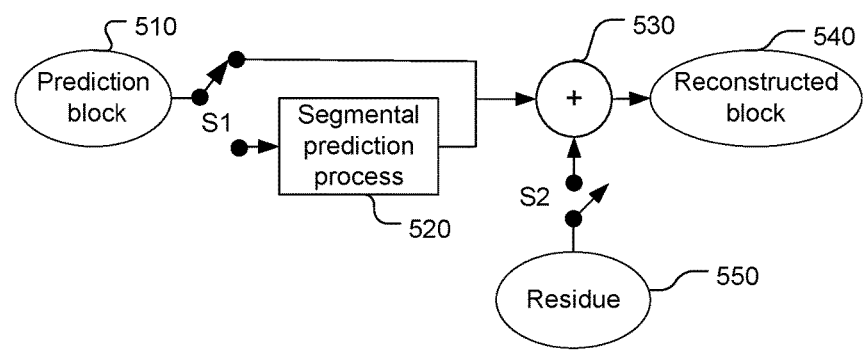
FIG. 5 illustrates an example of segmental prediction architecture at the decoder side.

In order to improve the performance of predictive coding using a prediction block, a segmental prediction process is disclosed. According to one embodiment of the present invention, the prediction block is processed by a segmental process before it is used to derive the residues at the encoder side or derive the reconstruction at the decoder side. In another embodiment, the prediction block is processed by a segmental process, and then the modified prediction block is output as the reconstruction without adding to residues. FIG. 5 illustrates an example of segmental prediction architecture at the decoder side. The prediction block (510) is used for reconstruction. Switch S1 is used to select either the conventional prediction process (S1 closed at upper position as shown) or the segmental prediction process (S1 closed at lower position). If the segmental prediction process is selected, the prediction block (510) is processed by the segmental prediction process (520) before it is used as the predictor for constructing the reconstructed block (540) using an adder (530). Switch S2 at the closed position allows the residue (550) to be added to the modified prediction block to form the reconstructed block (540). If Switch S2 is at the open position, the modified prediction block is output as the reconstruction block.

The prediction block can be obtained by intra-prediction, inter-prediction, intra-block copy (i.e., IntraBC) prediction or any combination of them. For example, a part of the prediction block can be obtained by inter-prediction, and another part of the prediction block can be obtained by intra-block copy prediction.

Figure 6:
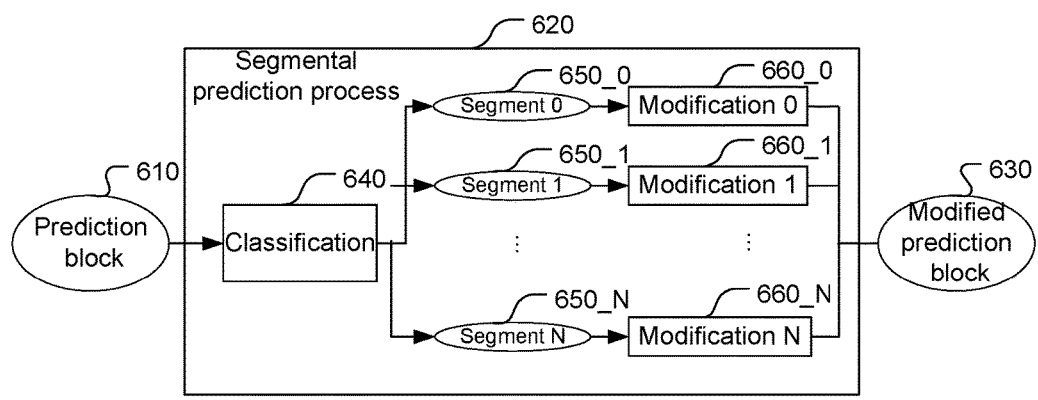
FIG. 6 illustrates an example of the segmental process, which includes two steps corresponding to classification and segment-based processing.

In the segmental process, there are two steps generally as depicted in FIG. 6. The prediction block (610) is processed by the segmental prediction process (620) to generate a modified prediction block (630). In the segmental prediction process (620), the prediction block (610) is processed by classification (640) to generate two or more segments (650_0, . . . , 650_N). Pixels in a segment can be adjacent or not. In other words, two groups of samples in a block belonging to the same segment may be disjoint. Each segment is processed by corresponding modification (660_0, . . . , 660_N). The modified prediction block (630) consists of the modified segments. The modification step is also called 'treatment', in which pixels in different segments are treated in different ways. The number of segments can be any positive integers such as 1, 2, 3, etc.

There are various means to classify the prediction samples. For example, the prediction samples can be classified according to their values. The prediction samples can also be classified according to their positions. Furthermore, the prediction values can be classified according to their gradients. Gradients can be determined by applying operators such as Sobel, Roberts, and Prewitt as known in the art. Anyone or a combination of the value, the position and the gradient can be used for classifying the prediction samples.

In one embodiment, the classification is not applied if there is only one segment in the prediction block. In another embodiment, the prediction block is classified into two segments in the classification step. A pixel is classified according to its relationship with respect to a threshold value T. For example, a pixel is classified into segment 0 if its value is smaller than T and otherwise it is classified into segment 1. In another example, a pixel is classified into segment 0 if its value is smaller than or equal to T (i.e., no larger than T), and otherwise it is classified into segment 1.

Figure 7:
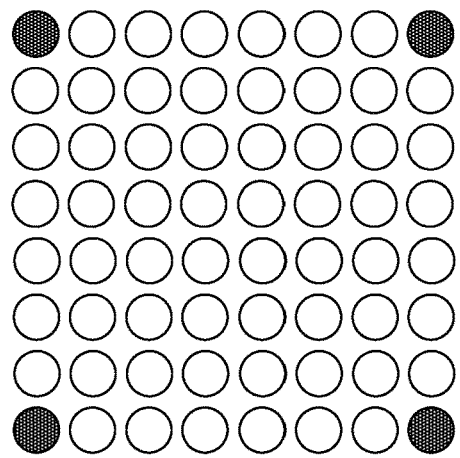
FIG. 7 illustrates an example of simplified derivation of the threshold based on four corner pixels of the prediction block.

When a threshold T is used for a block for classification, the threshold T can be calculated as a function of all pixel values in the prediction block, such as T=f(P), where f(.) is a function and P represents all pixel value in the prediction block. For example, T can be calculated as the average value of all pixel values in the prediction block. Instead of the average, T can also be calculated as the middle value (i.e., median) of all pixel values in the prediction block. In order to simplify the threshold value derivation, T can be calculated as the average value of partial pixels in the prediction block, such as four corner values as shown in FIG. 7 according to one embodiment. In FIG. 7, T is calculated as the average value of the four corner pixels shown as pattern-filled circles. In another example, T is calculated as the average value of the minimum and the maximum pixel value in the prediction block. In other words, if Vmax and Vmin represent the maximum and the minimum pixel values of the prediction block respectively, the threshold can be determined according to T=(Vmax+Vmin)/2.

In another embodiment, the prediction block is classified into M (M>2) segments in the classification step. A pixel is classified according to its relationship with respect to M−1 threshold numbers $T_1 \leq T_2 \leq \ldots \leq T_{M-1}$. For example, M is equal to 3, a pixel is classified into segment 0 if its value is smaller than $T_1$; the pixel is classified into segment 2 if its value is larger than $T_2$; and otherwise it is classified into segment 1. In another example, a pixel is classified into segment 0 if its value is smaller than or equal to $T_1$; the pixel is classified into segment 2 if its value is larger than $T_2$; and otherwise it is classified into segment 1.

In yet another embodiment, $T_k$ is calculated as a function of all the pixel values in the prediction block, where k is from 1 to M−1. For example, $T_k=f_k(P)$, where P represents all pixel values in the prediction block. In another embodiment, $T_k$ is calculated based on a part of the pixel values in the prediction block.

In still another embodiment, M is equal to 3 and $T_k$ is calculated as $$T_1=(T+V\text{min})/2, \quad (1)$$

and $$T_2=(V\text{max}+T)/2, \quad (2)$$

where T is the average value of all the pixel values in the prediction block. Vmax and Vmin are the maximum and the minimum pixel values in the prediction block respectively.

Figure 8:
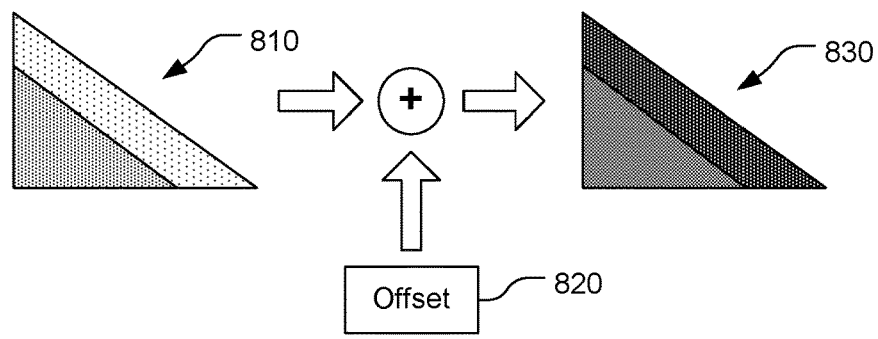
FIG. 8 illustrates an example of segmental prediction process according to one embodiment of the present invention, where an offset $Off_U$ is added to the pixel value of each pixel in segment U to form the modified prediction segment.

After classification, the samples in each segment are "treated" or modified. In one embodiment, an offset $\text{Off}_U$ is added to a pixel in each segment, denoted as segment U, in the treatment process to derive the new prediction value as shown in FIG. 8. If Vold is the pixel value before the treatment and Vnew is the pixel value after the treatment respectively, the treatment process can be represented as Vnew=Vold+$\text{Off}_U$. In FIG. 8, a prediction segment (810) consists of different pixel values as indicated by different fill patterns. The treatment or modification adds an offset (820) to individual pixels to form modified pixels for the corresponding modified prediction segment (830) of the modified prediction block. In this embodiment, the pixels after the treatment process can hold different values in one segment.

Figure 9:
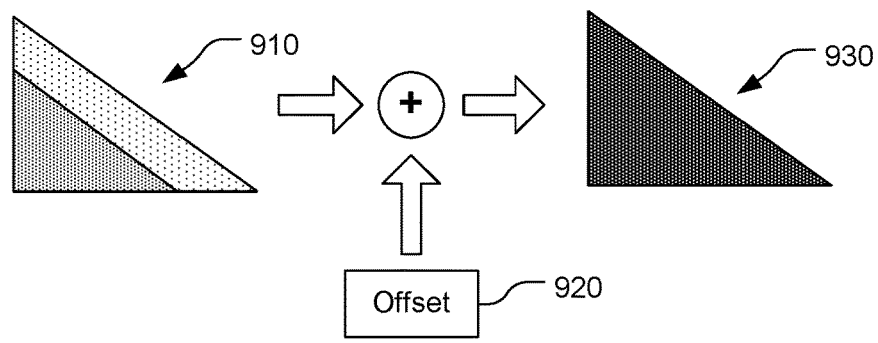
FIG. 9 illustrates an example of segmental prediction process according to one embodiment of the present invention, where an offset $Off_U$ is added to an estimated pixel value $E_U$ of segment U as a prediction value for all pixels of a modified prediction segment for the segment U.

In another embodiment, all pixels in segment U have the same pixel value $V_U$ after the treatment process. An offset $\text{Off}_U$ is added to an estimated value $E_U$ to derive $V_U$, i.e., $V_U=E_U+\text{Off}_U$ as shown in FIG. 9. In FIG. 9, a prediction segment (910) consists of different pixel values as indicated by different fill patterns. The treatment or modification adds an offset (920) to the estimated value $E_U$ to form modified pixels for the corresponding modified prediction segment (930) of the modified prediction block. In this example, all modified pixels in the modified prediction segment (930) have the same pixel value (i.e., $V_U$).

Figure 10A:
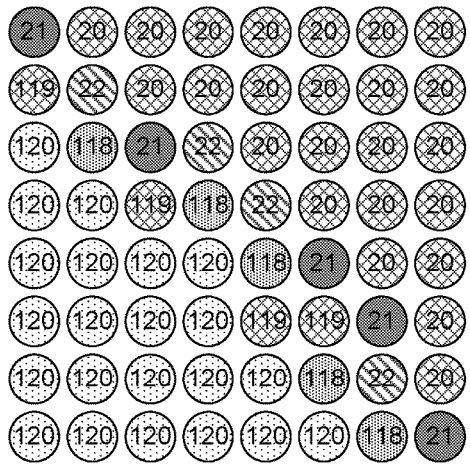
FIG. 10A-FIG. 10C illustrate an example of classification process, where a prediction block is classified into two segments according to pixel values.
Figure 10B:
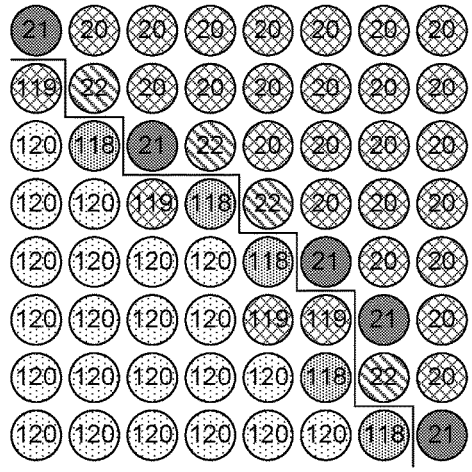
Figure 10C:
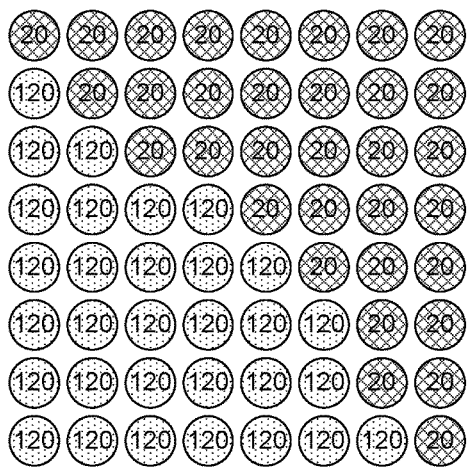

FIG. 10A-FIG. 10C illustrate an example of segmental prediction process according to the above embodiment, where a prediction block is classified into two segments according to pixel values. FIG. 10A shows an exemplary prediction block consisting of 8×8 pixels, where the corresponding pixel values are indicated by the numbers in the circles. FIG. 10B illustrates the result of classification, where the pixels are classified into two segments as shown by the staircase line. The pixels in the upper right side of the staircase line belong to one segment and the pixels in the lower left side of the staircase line belong to another segment. FIG. 10C illustrates an example of modified prediction block, where an offset is added to an estimated value to derive a modified pixel value for all pixels in each segment.

In yet another embodiment, $E_U$ is calculated as a function of all the pixel values in segment U according to $E_U=f(P_U)$, where $P_U$ represents all the pixel values in segment U. For example, $E_U$ is calculated as the average value of all the pixel prediction values in segment U. In another example, $E_U$ is calculated as the middle value (i.e., median) of all the pixel values in segment U of the prediction block. $E_U$ may also be calculated as the average value of the minimum and the maximum pixel values in segment U of the prediction block according to $E_U=(V^U max+V^U min)/2$, where $V^U max$ and $V^U min$ are the maximum and the minimum pixel values in segment U of the prediction block respectively.

In still another embodiment, $E_U$ is calculated as the mode value of the pixel values in segment U. The mode value is defined as the value that appears most often in segment U. An exemplary procedure to determine the mode value of the pixel values in segment U is as follows. Let MinV and MaxV be the possible minimal and maximum pixel values respectively. If the bit depth is 8, MinV is 0 and MaxV is 255. For i from MinV to MaxV, a variable Count[i] is initialized to be 0 for all i. For each pixel in segment U, Count[v]++, where v is the pixel value. Finally, m is output as the mode value if Count[m] is the largest among all Count[i]'s with i from MinV to MaxV.

Figure 11:
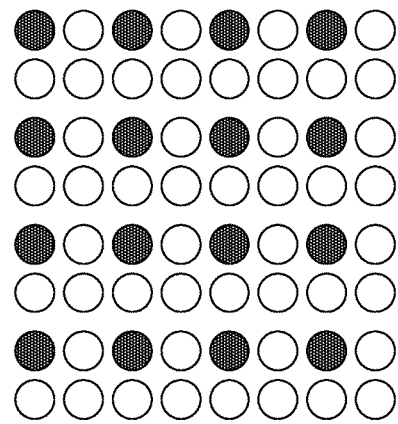
FIG. 11 illustrates an example of derivation of the estimated pixel value $E_U$ based on partial pixels at special positions in the segment U corresponding to every other pixels in the segment U horizontally and vertically.

Other techniques to calculate the estimated value are also disclosed herein. In order to reduce required computation or to adapt to local characteristics, $E_U$ can be calculated based on partial pixels (such as pixels at special positions) in the segment U. For example, $E_U$ can be calculated as the mode value of the pixels at special positions in the segment U. The mode value is defined as the pixel value that appears most often in segment U. Various sets of special positions can be used as well. For example, the special positions may correspond to the pixels at (x,y) in the segment U satisfying (x%2==0) && (y%2==0). FIG. 11 illustrates the example corresponding to pixels at (x,y) satisfying (x%2==0) && (y%2==0), where the special positions are indicated by pattern-filled circles. $E_U$ can be calculated as the mode value or any statistics value of the pixels at these special positions. The special positions in FIG. 11 correspond to positions for every other pixel in the horizontal and vertical directions. Therefore, only one quarter of the total pixels in the block is used to derive the estimated value. While the mode value of pixels at special positions is used as the estimated pixel value, the average or median may also be used as the estimated pixel value.

An exemplary algorithm is disclosed as follows. First, a set of variables are initialized. The variables include sampleCount[j][k], nSegNum[xCb][yCb], mostCount[j] and segPred[j]. Variable sampleCount[j][k] represents the sample count for pixel value k in segment j and variable sampleCount[j][k] is set to 0 for all k from 0 to (1<<BitDepth$_Y$)−1, and all j from 0 to nSegNum[xCb][yCb]−1. Variable mostCount[j] represents the most frequent appearing pixel value for segment j and variable mostCount[j] is set to 0 for all j from 0 to nSegNum[xCb][yCb]−1. Variable segPred[j] represents the required $E_j$ for segment j and variable segPred[j] is set to (1<<(BitDepth$_Y$−1) for all j from 0 to nSegNum[xCb][yCb]−1. For y in the range of 0 to nTbS−1 and x in the range of 0 to nTbS−1, wherein nTbS represents the block size, the following applies:

When y%2==0 && x % 2==0, the following applies:
  j=segIdx[x][y].
  sampleCount[j][refSamples [x][y]]++.
    When sampleCount[j][refSamples [x][y]]>mostCount[j],
      mostCount[j] is set equal to sampleCount[j][refSamples [x][y]] and
      segPred[j] is set equal to refSamples [x][y].

In the algorithm above, refSamples[x][y] represents the sample value at position (x,y) in the block. segIdx[x][y] represents the segment index for position (x,y).

If no pixel at the special positions in segment U is available, a default $E_U$ is used. The default value can be 0, 128, 255, 1<<(bit_depth−1), (1<<bit_depth)−1 or any other valid integers, where bit_depth represents the bit depth of the pixel value.

As mentioned above, the treatment process uses an offset $Off_U$ for segment U. The offset value can be signaled explicitly from the encoder to decoder. The offset value may also be derived implicitly by the decoder. For example, the offset $Off_U$ for segment U can be calculated by the encoder according to the original pixel values in segment U and prediction values in segment U. The offset $Off_U$ for segment U is then calculated at the encoder side by subtracting the average value of all original pixel values in segment U and the average value of all prediction values in segment U.

In another embodiment, the offset $Off_U$ for segment U is calculated at the encoder side by subtracting the average value of all the pixel original values in segment U from $E_U$.

While the offset $Off_U$ for segment U is signaled in the above examples, according to another embodiment, the DLT index offset $OffIdx_U$ can be signaled instead. Furthermore, a flag can be signaled to indicate whether Off or OffIdx is zero for all segments in the prediction block when segmental prediction process is applied. If the condition holds, then no Off or OffIdx for segments in the block is signaled and all Off or OffIdx's are implied as 0. If the flag indicates that at least one Off or OffIdx for a segment in the prediction block is not zero, and all Off or OffIdx for segments before the last segment are signaled to be 0, then the Off or OffIdx for the last segment cannot be 0. An embodiment of the present invention takes advantage of this condition to code the last segment more efficiently. For example, Off−1 or OffIdx−1 instead of Off or OffIdx for the last segment is coded since Off or OffIdx for the last segment cannot be 0. At the decoder side, the decoded value for Off or OffIdx for the last segment is incremented by 1.

In still another embodiment, $V_U$ is calculated as $V_U=g(f(E_U) \text{ OffIdx}_U)$, where f represents a function mapping a depth value to a DLT index, and g represents a function mapping a DLT index to a depth value. $f(E_U)+OffIdx_U$ is clipped to a valid DLT index.

In another embodiment, the DLT index offset $OffIdx_U$ for segment U is calculated at the encoder side by subtracting DLT index of the average value of all original pixel values in segment U from the DLT index of $E_U$. In other words, if $A_U$ is the average value of all original pixel values in segment U and f represents a function mapping a depth value to a DLT index, the DLT index offset $OffIdx_U$ is calculated according to $OffIdx_U=f(A_U)-f(E_U)$.

In another embodiment, residues of a block are not signaled and are implied to be all 0 if the segmental prediction process is applied in the block.

In one embodiment, the segmental prediction process can be enabled adaptively. The encoder can send the information to the decoder explicitly regarding whether to use the segmental prediction process. Alternatively, the decoder can implicitly derive information regarding whether to use the segmental prediction process in the same way as the encoder. In this way, there is no need to signal information regarding whether to use the segmental prediction process.

In another embodiment, the segmental prediction process can be applied based on coding tree unit (CTU), coding unit (CU), prediction unit (PU) or transform unit (TU). As is known in the art, CTU, CU, PU and TU are various processing units for various processing as defined in the high efficiency video coding (HEVC) standard.

In yet another embodiment, the encoder can send the information to the decoder regarding whether to use the segmental prediction process in video parameter set (VPS), sequence parameter set (SPS), picture parameter set (PPS), slice header (SH), CTU, CU, PU, or TU.

In still another embodiment, whether to apply the segmental prediction process to a CU may depend on the CU size. For example, the segmental prediction process is only applied to CUs with CU size larger than 8×8. In another example, the segmental prediction process is only applied to CUs with size smaller than 64×64.

In yet another embodiment, the segmental prediction process is only applied to CUs with certain PU partitions. For example, it can only be applied to CUs with 2N×2N PU partition.

In still another embodiment, the segmental prediction process can only be applied to CUs with certain coding modes. For example, it can only be applied to CUs coded with the IBC mode. In another example, it can only be applied to CUs coded with the InterSDC mode.

In one embodiment, the number of segments in the segmental prediction process is adaptively determined. The encoder can send the information regarding the number of segments to the decoder explicitly when the segmental prediction process is used. Alternatively, the decoder can derive the number in the same way as the encoder implicitly. In this case, there is no need to signal the information regarding the number of segment explicitly. When the information regarding the number of segments is signaled, the encoder can send the information to the decoder in video parameter set (VPS), sequence parameter set (SPS), picture parameter set (PPS), slice header (SH), CTU, CU, PU, or TU. The encoder may also send the information regarding the offset for each segment to the decoder in video parameter set (VPS), sequence parameter set (SPS), picture parameter set (PPS), slice header (SH), CTU, CU, PU, or TU where the segmental prediction process is used.

The encoder can send the information to the decoder regarding whether to use the segmental prediction process in a CU coded with InterSDC mode. The encoder can send the information to the decoder regarding the number of segments in a CU coded with InterSDC mode. The encoder can also send the information to the decoder regarding the offsets or DLT index offsets for each segment in a CU coded with InterSDC and the segmental prediction process is used for the CU. Furthermore, the segmental prediction process can be applied to the texture component as well as depth components in 3D video coding.

The segmental prediction process mentioned above can be applied to the luma component. It can also be applied to chroma components. The decision regarding whether to use segmental prediction process can be determined individually for each component. In this case, the associated information will be signaled individually. The decision regarding whether to use segmental prediction process can also be made together for all components. In this case, a single piece of information will be signaled.

The number of segments can be controlled individually for each component when the segmental prediction process is used. In this case, the related information will be signaled individually. Alternatively, the number of segments can be controlled together for all components when the segmental prediction process is used. In this case, a single piece of information will be signaled. Furthermore, the offset for each segment can be decided individually for each component when the segmental prediction process is used. In this case, the associated information will be signaled individually. The offset for each segment may also be decided together for all components when segmental prediction process is used. In this case, a single piece of associated information will be signaled.

Figure 12:
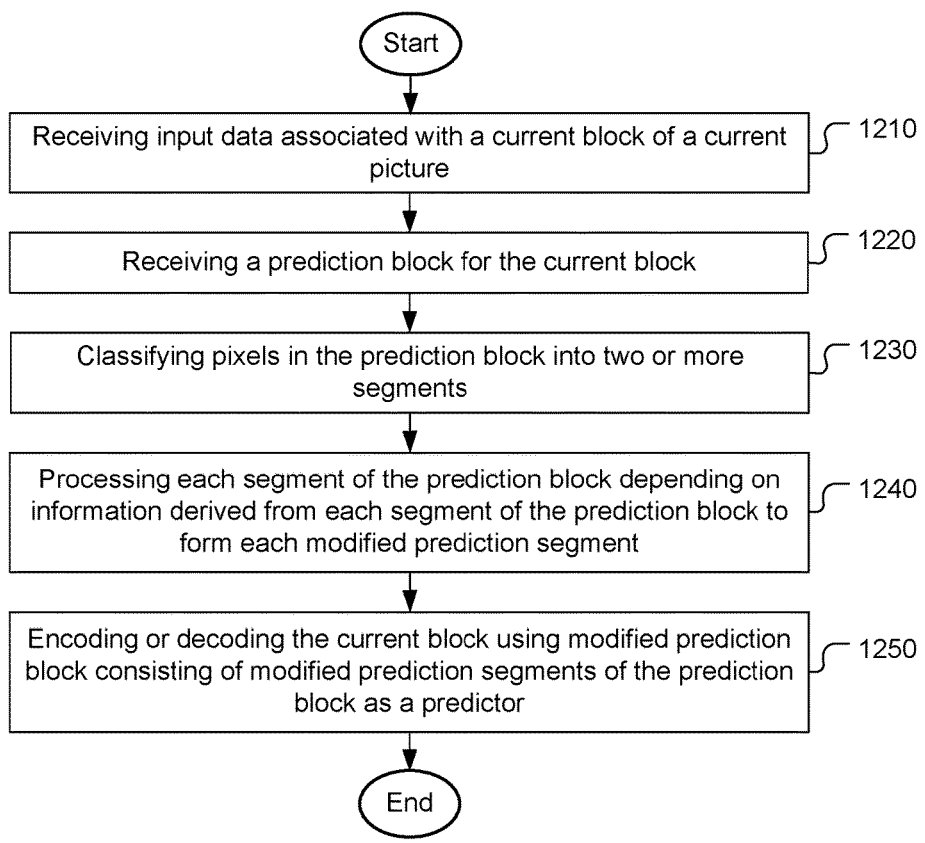
FIG. 12 illustrates an exemplary flowchart for a video coding system incorporating segmental prediction process according to an embodiment of the present invention.

FIG. 12 illustrates an exemplary flowchart for a video coding system incorporating segmental prediction process according to an embodiment of the present invention. The input data associated with a current block is received as shown in step 1210. The input data associated with the current block may be accessed from a media such as a RAM or DRAM in a system. Also the input data associated with the current block may be received directly from a processor (such as a central processing unit, a controller or a digital signal processor). At an encoder side, the input data corresponds to the pixel data (texture data or depth data) to be coded. At the decoder side, the input data corresponds to coded data (coded texture data or coded depth data) to be decoded. A prediction block (texture data or depth data) for the current block is received in step 1220. Pixels in the prediction block are classified into two or more segments in step 1230. Each segment of the prediction block is processed depending on information derived from each segment of the prediction block to form each modified prediction segment as shown in step 1240. The current block is then encoded or decoded using modified prediction block consisting of modified prediction segments of the prediction block as a predictor in step 1250.

The exemplary flowchart shown in FIG. 12 is for illustration purpose. A skilled person in the art may re-arrange, combine steps or split a step to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of predictive coding for a three-dimensional or multi-view video coding system, the method comprising:
  receiving input data associated with a current block of a current picture;
  receiving a reference block for predicting the current block, wherein the reference block is derived based on one or more of: intra-prediction, inter-prediction, and intra-block copy;
  classifying pixels in the reference block into two or more segments;
  processing each segment of the reference block to form each modified prediction segment, wherein processing each segment comprises adding, for each segment, an offset OffU to a pixel value of each pixel, wherein the offset OffU is either signaled explicitly or derived according to original pixel values and prediction values in each segment; and
  encoding or decoding the current block using modified reference block consisting of modified prediction segments of the reference block as a predictor.

2. The method of claim 1, wherein said classifying the pixels in the reference block is based on pixel values, pixel positions or gradients of the pixels in the reference block.

3. The method of claim 2, wherein the pixels in the reference block are classified into two segments according to relationship of the pixel values of the pixels in the reference block with respect to a threshold T.

4. The method of claim 3, wherein the threshold T is calculated according to:
  an average value of the pixels in the reference block;
  a middle value of the pixels in the reference block;
  an average value of partial pixels in the reference block;
  an average value of four corner pixels in the reference block; or
  an average value of a minimum pixel value and a maximum pixel value in the reference block.

5. The method of claim 2, wherein the pixels in the reference block are classified into M segments according to relationship of the pixel values of the pixels in the reference block with respect to (M−1) thresholds T1, T2, . . . , TM−1, and wherein $T1<=T2<= . . . <=TM-1$ and M is greater than 2.

6. The method of claim 5, wherein threshold Tk is calculated based on at least one of the pixel values of the pixels in the reference block, where k is from 1 to (M-1).

7. The method of claim 5, wherein M is equal to 2, the pixel in the reference block is classified into segment 0 if the pixel value for the pixel is smaller than T1 or no larger than T1; otherwise, the pixel in the reference block is classified into segment 1.

8. The method of claim 5, wherein M is equal to 3, the pixel in the reference block is classified into segment 0 if the pixel value for the pixel is smaller than T1 or no larger than T1; the pixel in the reference block is classified into segment 2 if the pixel value for the pixel is larger than T2; otherwise, the pixel in the reference block is classified into segment 1; and wherein $T1=(T+Vmin)/2$, $T2=(Vmax+T)/2$, T is an average value of the pixels in the reference block, and Vmax and Vmin are a maximum pixel value and a minimum pixel value in the reference block respectively.

9. The method of claim 2, wherein the pixels in the reference block are classified into said two or more segments according to the gradients of the pixels in the reference block using Sobel, Roberts, and Prewitt operator on the pixels in the reference block.

10. The method of claim 1, wherein an encoder signals information to a decoder in video parameter set (VPS), sequence parameter set (SPS), picture parameter set (PPS), slice header (SH), coding tree unit (CTU), coding unit (CU), prediction unit (PU) or transform unit (TU) regarding whether to use segmental prediction process, and wherein the segmental prediction process comprises said classifying the pixels in the reference block, said processing each segment of the reference block, and said encoding or decoding the current block using the modified reference block.

11. The method of claim 10, wherein the segmental prediction process is applied to coding units with a size larger than 8×8 or smaller than 64×64.

12. The method of claim 10, wherein the segmental prediction process is applied to coding units with 2N×2N partition.

13. The method of claim 1, wherein syntax element representing a number of said two or more segments is transmitted from an encoder to a decoder or the number of said two or more segments is derived at the decoder implicitly, wherein the syntax element representing the number of said two or more segments is transmitted in video parameter set (VPS), sequence parameter set (SPS), picture parameter set (PPS), slice header (SH), coding tree unit (CTU), coding unit (CU), prediction unit (PU) or transform unit (TU).

14. The method of claim 1, wherein said processing each segment of the reference block adds an offset to the pixels in each segment, and wherein information related to the offset is transmitted in video parameter set (VPS), sequence parameter set (SPS), picture parameter set (PPS), slice header (SH), coding tree unit (CTU), coding unit (CU), prediction unit (PU) or transform unit (TU).

15. The method of claim 1, wherein the input data corresponds to texture data or depth data of the current picture.

16. The method of claim 1, wherein the input data corresponds to chroma components of the current picture, wherein the chroma components of the current picture use separate information or share same information related to segmental prediction process, wherein the segmental prediction process comprises said processing each segment of the reference block, and said encoding or decoding the current block using the modified reference block.

17. An apparatus for predictive coding in a three-dimensional or multi-view video coding system, the apparatus comprising one or more electronic circuits configured to:
  receive input data associated with a current block of a current picture;
  receive a reference block for predicting the current block, wherein the reference block is derived based on one or more of: intra-prediction, inter-prediction, and intra-block copy;
  classify pixels in the reference block into two or more segments;
  process each segment of the reference block to form each modified prediction segment, wherein processing each segment comprises adding, for each segment, an offset OffU to a pixel value of each pixel, wherein the offset OffU is either signaled explicitly or derived according to original pixel values and prediction values in each segment; and encode or decode the current block using modified reference block consisting of modified prediction segments of the reference block as a predictor.

18. A method of predictive coding for a three-dimensional or multi-view video coding system, the method comprising:

receiving input data associated with a current block of a current picture;

receiving a reference block for predicting the current block, wherein the reference block is derived based on one or more of: intra-prediction, inter-prediction, and intra-block copy;

classifying pixels in the reference block into two or more segments;

processing each segment of the reference block to form each modified prediction segment, wherein processing each segment comprises adding, for each segment, an offset OffU to an estimated pixel value EU, wherein the offset OffU is either signaled explicitly or derived according to original pixel values and prediction values in each segment; and encoding or decoding the current block using modified reference block consisting of modified prediction segments of the reference block as a predictor.

19. The method of claim 18, wherein the estimated pixel value EU is calculated according to:

an average value of the pixels in the segment U;

a middle value of the pixels in the segment U;

an average value of a minimum pixel value and a maximum pixel value of the pixels in segment U; or a mode value of the pixels in the segment U, wherein the mode value of the pixels in the segment U corresponds to a most frequent appearing pixel value in the segment U.

20. The method of claim 19, wherein the estimated pixel value EU is calculated based on all pixels in the segment U.

21. The method of claim 18, wherein the estimated pixel value EU is calculated based on partial pixels at special positions in the segment U.

22. The method of claim 21, wherein the estimated pixel value EU is calculated as a mode value of the partial pixels at the special positions in the segment U, wherein the mode value of the partial pixels at the special positions in the segment U corresponds to a most frequent appearing pixel value of the partial pixels in the segment U.

23. The method as claimed in claim 22, wherein the partial pixels at the special positions in the segment U correspond to every other pixels in the segment U horizontally and vertically.

24. The method as claimed in claim 21, wherein a default estimated pixel value EU is used if no pixel exists at the special positions in the segment U, wherein the default estimated pixel value $E_u$ corresponds to 0, 128, 255, 1<<(bit_depth-1) or (1<<bit_depth)-1, and wherein bit_depth corresponds to bit depth of the pixel values of the pixels in the segment U.

* * * * *